United States Patent [19]

Shono

[11] 4,361,865

[45] Nov. 30, 1982

[54] SWITCHING REGULATOR TYPE POWER SUPPLY CIRCUIT

[75] Inventor: Masahiro Shono, Osaka, Japan

[73] Assignee: Sanyo Electric Co., Ltd., Moriguchi, Japan

[21] Appl. No.: 251,059

[22] Filed: Apr. 6, 1981

[30] Foreign Application Priority Data

Apr. 11, 1980 [JP] Japan .................................. 55-48530

[51] Int. Cl.³ ......................................... H02M 3/335
[52] U.S. Cl. ....................................... 363/19; 363/49
[58] Field of Search ................... 331/112; 363/18-21, 363/97

[56] References Cited

U.S. PATENT DOCUMENTS 4,208,705  6/1980  Hosoya ................................ 363/19

OTHER PUBLICATIONS

"Supply Module with Supply Isolation", R. Dangschat et al., Funkschau, vol. 47, No. 5, pp. 40-43, 2/28/75.

*Primary Examiner*—William M. Shoop
*Attorney, Agent, or Firm*—Armstrong, Nikaido, Marmelstein & Kubovcik

[57] ABSTRACT

A power supply circuit comprises a converter transformer and a switching transistor. The input winding of the transformer, the collector and emitter of the transistor, and a collector-emitter current detecting resistor are connected in series, while the base of the transistor is connected through a starting resistor to a direct current input and is also connected to one end of the feedback winding of the transformer. A turning off capacitor and a diode are connected in series between both ends of the feedback winding, whereby the capacitor is charged on the occasion of non-conduction of the transistor. A switching element of two transistors as cascade connected is connected directly or through the above described resistor between one end of the capacitor and the emitter of the transistor. A variable direct current voltage obtained based on the voltage from the detecting winding of the transformer and a voltage developed across the above described resistor are applied to the control input of the switching element, so that the switching element is rendered conductive when the voltage developed across the resistor reaches a predetermined value determined by the variable direct current voltage, whereby the transistor is turned off by the voltage across the capacitor.

8 Claims, 3 Drawing Figures

SWITCHING REGULATOR TYPE POWER SUPPLY CIRCUIT

BACKGROUND OF THE INVENTION

1. Field of the Invention

The present invention relates to a switching regulator type power supply circuit. More specifically, the present invention relates to such power supply circuit of a self-excited oscillation type.

2. Description of the Prior Art

A switching regulator type power supply of a self-excited oscillation type has been put into practical use, due to the fact that an external driver circuit, a driver transformer and the like can be dispensed with and hence a circuit configuration becomes simple. One type of such self-excited oscillation type power supply comprises a blocking oscillation type power supply, as proposed for example in German Pat. No. 2417628 (corresponding to British Pat. No. 1494259) with reference to FIG. 1.

Now the power supply circuit shown in FIG. 1 of the above referenced patent will be described to point out a technical problem to be solved by the present invention.

FIG. 1 is a schematic diagram showing such power supply circuit, which basically comprises an input rectifying portion 1, a blocking oscillator portion 2, a starter circuit 3, an output rectifying portion 4, and a control circuit portion 5.

In the following the above referenced patent will be described to the extent required for understanding of the present invention.

A switching transistor TR1 of an NPN type included in the blocking oscillator portion 2 is connected at the collector thereof to one terminal of an input winding N1 of a converter transformer T. The other terminal of the input winding N1 is connected to an input line L1 of a direct current voltage. The emitter of the switching transistor TR1 is connected to one end of a detecting winding N3 of a transformer T, i.e. a line L5 and the line L5 is a reference potential. A resistor R11 is connected to the line L5 so that a collector-emitter current flows through the resistor R11. The other end of the detecting winding N3 is connected through a line L4 and a diode D7 to a capacitor C5 and the other end of the capacitor C5 is connected to the reference potential, i.e. the line L5. The transformer T comprises a feedback winding N2 and one end a of the winding N2 is connected to the junction of a turning off capacitor C9 and the base of the switching transistor TR1, while the other end b of the winding N2 is connected to the reference potential, i.e. the line L5 through a series connection of a parallel connection of two diodes D10 and D11 coupled in the opposite poralities to each other and a resistor R12. The terminal b of the winding N2 is further connected through a diode D9 to the anode of a silicon controlled rectifier SC and further through a series connection of the diode D9 and the turning off capacitor C9 to the base of the switching transistor TR1. The cathode of the silicon controlled rectifier SC is connected to the input line L2 and through a parallel connection of a resistor R11 and a capacitor C7 to the reference potential line L5. The gate of the silicon controlled rectifier SC is connected to the junction of a voltage divider implemented by two resistors R9 and R10. One end of the voltage divider is connected to the reference potential line L5 and the other end of the voltage divider is connected through a diode D8 to one end a of the feedback winding N2. The capacitor C6 is connected in parallel with the voltage divider implemented by the resistors R10 and R11.

The collector of an error detecting transistor TR2 of a PNP type included in the control circuit portion 5 is connected through a resistor R7 to the junction B of two resistors R10 and R9 constituting a voltage divider. The base of the transistor TR2 is connected to the tap of a voltage divider implemented by the resistor R5, the variable resistor VR and the resistor R6 and the voltage divider is connected in parallel with the capacitor C5. A series connection of a zener diode D6 and a resistor R8 is connected in parallel with the capacitor C5 and the resistor R8 is connected between the emitter of the transistor TR2 and the reference potential line L5. The capacitor C4 is connected in parallel with the resistor R9.

The input line L3 is connected through a series connection of the diode D5, the resistor R4 and the capacitor C3 constituting the starting circuit portion 3 to the base of the switching transistor TR1. The resistor R3 is connected between the junction of the diode D5 and the resistor R4 and the input line L2.

The capacitor C7 is connected in parallel with the resistor R11. A series connection of the capacitor C10 and the resistor R13 is disposed between the collector and the emitter (the reference potential line L5) of the switching transistor TR1.

The converter transformer T has the output winding N4 having two output taps and having one end connected to the ground. The respective taps are connected through diodes D12 and D13 constituting the output rectifying portion 4 to the direct current output terminal. The capacitor C11 is connected in parallel with the diode D12 and the cathodes of the respective diodes D12 and D13 are connected through smoothing capacitors C12 and C13 to the ground.

The input lines L1 and L2 are connected directly and through a fuse F2, respectively, to the output of the bridge rectifier BD comprising four diodes D1 to D4 and constituting the input rectifying portion 1. The smoothing capacitor C2 and the resistor R2 are disposed in parallel with the bridge rectifier BD. Two inputs of the bridge rectifier BD are connected through the resistor R1 and directly, respectively, to the line filter LF. Two inputs of the line filter LF are connected through a power supply switch SW and through the fuse F1, respectively, to the alternating current input. The ends of the two coils of the line filter LF at the side of the bridge rectifier BD are coupled together by the capacitor C1.

The load circuit of the switching transistor TR1 comprises a series connection for the direct current input through the input winding N1 of the converter transformer T, the collector-emitter path and the resistor R11 via the input lines L1 and L2. The base control path of the switching transistor TR1 comprises a series connection of a parallel connection of the diodes D10 and D11 having the capacitor C8, the base-emitter path of the switching transistor TR1, the resistor R12 and the feedback winding N2.

The control circuit portion 5 having the error detecting transistor TR2 obtains a comparison voltage from the detecting winding N3 and the comparison voltage is rectified by the diode D7 and the rectified output is obtained from the capacitor C5 and thus from the junction C. The comparison voltage is applied through a voltage divider implemented by the resistor R5, the variable resistor VR and the resistor R6 to the base of the transistor TR2. The comparison voltage is compared by the transistor TR2 with the reference voltage generated by the zener diode D6. The collector current It of the error detecting transistor TR2 flows through the resistor R7 during the above described comparison.

A portion of the voltage generated across the capacitor C6 appears across the resistor R9, i.e. at the junction B in accordance with a voltage division ratio of the voltage divider implemented by the resistors R9 and R10. The capacitor C6 obtains a voltage from the feedback winding N2 through the diode D8.

The blocking oscillator portion 2 comprises the feedback winding N2, the diode D9 and the turning off capacitor C9. The capacitor C9 forms an operating voltage source of the silicon controlled rectifier SC so that the control path between the base and emitter of the switching transistor TR1 is blocked when the silicon controlled rectifier SC is rendered conductive.

The capacitor C6 is charged with the polarity corresponding to the polarity of the voltage generated across the resistor R9 and the voltage developed across the resistor R9 is applied to the gate of the silicon controlled rectifier SC as a bias voltage thereof, thereby to prevent the silicon controlled rectifier SC from being rendered conductive. The collector current It of the error detecting transistor TR2 flows through the resistor R9 and the current It forms a voltage in the direction opposite to the voltage developed across the capacitor C6. The voltage developed by the collector-emitter current applied to the resistor R11 is also directed to the opposite direction. The bias voltage applied to the gate of the silicon controlled rectifier SC is compensated by a large collector current of the transistor TR2 caused by too high an output voltage from the transformer T or by too large a collector-emitter current flowing through the resistor R11. If and when the compensating effect is sufficiently large enough to overcome the bias voltage, the silicon controlled rectifier SC would be rendered conductive. Accordingly, it is when the collector-emitter current of the switching transistor TR1 or the output voltage of the transformer T becomes too large that the above described compensating function is performed.

The starting circuit portion 3 is implemented by the input line L3, the diode D5, the capacitor C3 and the two resistors R3 and R4. The input line L3 is connected to the alternating current input and a pulse signal current Is having a repetition frequency rate identical to that of the alternating current input is supplied to the base of the switching transistor TR1 through the diode C5 and the RC elements R4 and C3.

In a normal operation the capacitor C6 and the turning off capacitor C9 are charged with the polarity shown during a non-conduction period of the switching transistor TR1. More specifically, in the non-conduction period of the switching transistor TR1 one end b of the feedback winding N2 becomes positive so that the capacitors C6 and C9 are charged with the currents Ir1 and Ir2, respectively, flowing through the paths shown. At that time the capacitor C9 is charged with a voltage lower than a predetermined voltage between the terminals b-a of the feedback winding N2 by a forward voltage drop (approximately 0.6 V) of the diode D9 included in the path of the current Ir2. The voltages across these capacitors C6 and C9 are also maintained during the conduction period of the switching transistor TR1.

On the other hand, in the conduction period of the switching transistor TR1 the capacitor C8 is charged to the forward voltage drop (approximately 0.6 V) of the diode D10 connected in parrallel therewith.

In the conduction period of the switching transistor TR1 a sum voltage of the voltage across the capacitor C9 and the voltage drop (approximately 0.6 V) between the base-emitter of the switching transistor TR1 is applied between the anode and cathode of the silicon controlled rectifier SC and thus between the anode and the reference potential line L5. When the voltage drop across the resistor R11 becomes lower than the gate voltage of the silicon controlled rectifier SC, i.e. the voltage at the point A becomes lower than the voltage at the point B, the silicon controlled rectifier SC is turned on. Accordingly, the turning off capacitor C9 is connected between the base and the emitter of the switching transistor TR1. Therefore, the switching transistor TR1 is reverse biased with the opposite polarity voltage shown of the capacitor C9, whereby the same is turned off. The silicon controlled rectifier SC as turned on need be turned off to be ready for the next conduction of the switching transistor TR1.

When the switching transistor TR1 is turned off, one end a of the feedback winding N2 is brought to a negative potential which is lower than the voltage at the point b by the above described predetermined voltage, when the voltage at the other terminal b is deemed as a reference. Accordingly, the point a becomes a negative potential lower with respect to the reference potential line L5 by a sum of the above described predetermined voltage and the voltage across the capacitor C8. Therefore, the base of the transistor TR1 becomes lower as compared with line L5 by a sum of the above described predetermined voltage and the voltage across the capacitor C8. On the other hand, a voltage slightly lower than the above described predetermined voltage is maintained in the turning off capacitor C9 during the conduction period as described previously. Accordingly, the cathode of the diode D9 and thus the anode of the silicon controlled rectifier SC comes to be supplied with a difference between the above described negative sum voltage and the voltage across the capacitor C9, with the result that the negative sum voltage becomes larger than the voltage across the capacitor C9 and the difference becomes nigative, whereby the silicon controlled rectifier SC is reverse biased. Thus, the silicon controlled rectifier SC is turned off. Accordingly, the switching transistor TR1 is turned on responsive to the input to the base thereof.

More specifically, a voltage developed at the point A due to a current Ii flowing through the collector and emitter on the occasion of conduction of the switching transistor TR1 and a voltage developed at the point B by a collector current It of the error detecting transistor TR2 and the first capacitor C6 for turing off are compared by means of the silicon controlled rectifier SC. If and when the voltage at the point A becomes lower than the voltage at the point B, the silicon controlled rectifier SC is rendered conductive, whereby the second capacitor C9 for turning off charged in the polarity as shown is connected between the base and emitter of the switching transistor TR1, whereby the said transistor TR1 is cut off. At that time the voltage at the point A is a negative voltage (deeming a line L5 as a reference potential) being increased by the above described current Ii as the time lapses, whereas the voltage at the point B is a negative voltage obtained by addition of the positive voltage determined by the magnitude of the above described current It and a constant negative voltage determined by the capacitor C6. Therefore, if and when the magnitude of the current voltage obtained at the point C from the detecting winding N3 changes, the magnitude of the negative voltage at the point B accordingly changes, with the result that the turn-off timing of the switching transistor TR1 is changed.

The FIG. 1 power supply circuit involves the following shortcomings. Firstly, since the FIG. 1 power supply circuit employs a silicon controlled rectifier SC, the same is inappropriate in the case where a constant voltage control operation of high efficiency is to be performed by selecting an oscillation frequency of the blocking oscillator portion 2 to be sufficiently high. The reason is that a silicon controlled rectifier of a low electric power commercially available is generally poor in a response rate.

Secondly, a discharging current of the first capacitor C6 for turning off the silicon controlled rectifier SC flows through resistors R9 and R10 and this current does not become constant, inasmuch as the collector current It of the error detecting transistor TR2 is not fixed. Therefore, it follows that the charging current Ir1 flowing from the feedback winding N2 to the above described capacitor C6 on the occasion of turning off of the switching transistor TR1 changes in accordance with the voltage at the point C. This means that the charging current Ir2 flowing to the second capacitor C9 for turning off and thus the voltage across said capacitor changes and accordingly it could happen that the switching transistor TR1 is not assuredly turned off.

Furthermore, although the starting current Is flowing to the blocking oscillator portion 2 flows from the line L3 of the input rectifying portion 1 through the path of the diode D5→the resistor R4→the capacitor C3→the base and emitter of the transistor TR1→the resistor R11→the line L2, on the occasion of starting a current flows through a path of the diode D5→the resistor R4→the capacitor C3→a→b of the feedback winding N2→the diode D11→the resistor R12→the resistor R11→the line L2 in addition to the above described path. The impedance of the latter mentioned path is approximately the same as that of the first mentioned path, inasmuch as the number of turns of the feedback winding N2 is small. Therefore, the starting circuit 3 must provide a current sufficiently larger than the required starting current and accordingly a power loss on the occasion of starting is increased.

Furthermore, the capacitor C6 and the diodes D8 and D11 are required in order to turn off the silicon controlled rectifier SC and the starting circuit 3 is implemented by the diode D5, the capacitor C3 and the resistors R3 and R4 (the resistor R3 is for discharging the capacitor C3), with the resultant disadvantage that the number of components is increased and reduction of the cost is hindered.

SUMMARY OF THE INVENTION

Briefly described, the present invention comprises a switching regulator type power supply circuit adapted for on/off controlling a direct current input by means of a switching transistor constituting a blocking oscillator with a converter transformer, wherein an input winding of the converter transformer, the collector and emitter of the switching transistor, and a resistor for detecting a collector-emitter current are in turn connected in series with the direct current input, a capacitor and a diode are in turn connected between one end of a feedback winding of the transformer connected to the base of the transistor and the other end of the feedback winding, so that the capacitor is charged with a voltage developed across the feedback winding on the occasion of non-conduction of the transistor, a switching element is connected through the resistor or directly between a junction of the diode and capacitor and the emitter of the transistor, so that a voltage developed across the resistor as well as a variable direct current voltage is applied to the controlled electrode of the switching element and a charged voltage of the capacitor is applied between the base and emitter of the transistor upon conduction of the switching element when the voltage developed across the resistor reaches a predetermined value determined by the direct current voltage, whereby the transistor is cut off.

Since the inventive power supply circuit of a switching regulator type is structured in the above described manner, the same brings about the following advantages in comparison with the previously described prior art circuit. Firstly, since a silicon controlled rectifier is not employed, a constant voltage control of high efficiency can be achieved even if the blocking oscillation frequency is selected to be sufficiently high. Secondly, an ample charging current can be supplied to a turning off capacitor from a feedback winding and accordingly a switching transistor can always be turned off with accuracy, while a circuit configuration for turning off may be simplified.

In a preferred embodiment of the present invention, a starting registor is connected between the base of the switching transistor and the direct current input line. According to the preferred embodiment, since a structure of the starting circuit is simple and the starting resistor can be used to serve also as a discharging resistor of a smoothing capacitor of the input rectifying portion, the number of components is decreased as a whole and the power supply circuit can be implemented with an inexpensive cost.

In another preferred embodiment of the present invention, two cascade connected transistors are used as a switching element. By connecting these two transistors to the reference potential line, the fall time of the switching transistor can be shortened by properly selecting the magnitude of the reverse directional current flowing between the base and emitter of the switching transistor on the occasion of turning off thereof.

Accordingly, a principal object of the present invention is to provide a switching regulator type power supply circuit of stability and high efficiency.

Another aspect of the present invention resides in a switching regulator type power supply circuit of a simplified structure and having a reduced number of components.

A further aspect of the present invention resides in a switching regulator type power supply circuit having a shortened fall time of a switching transistor.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
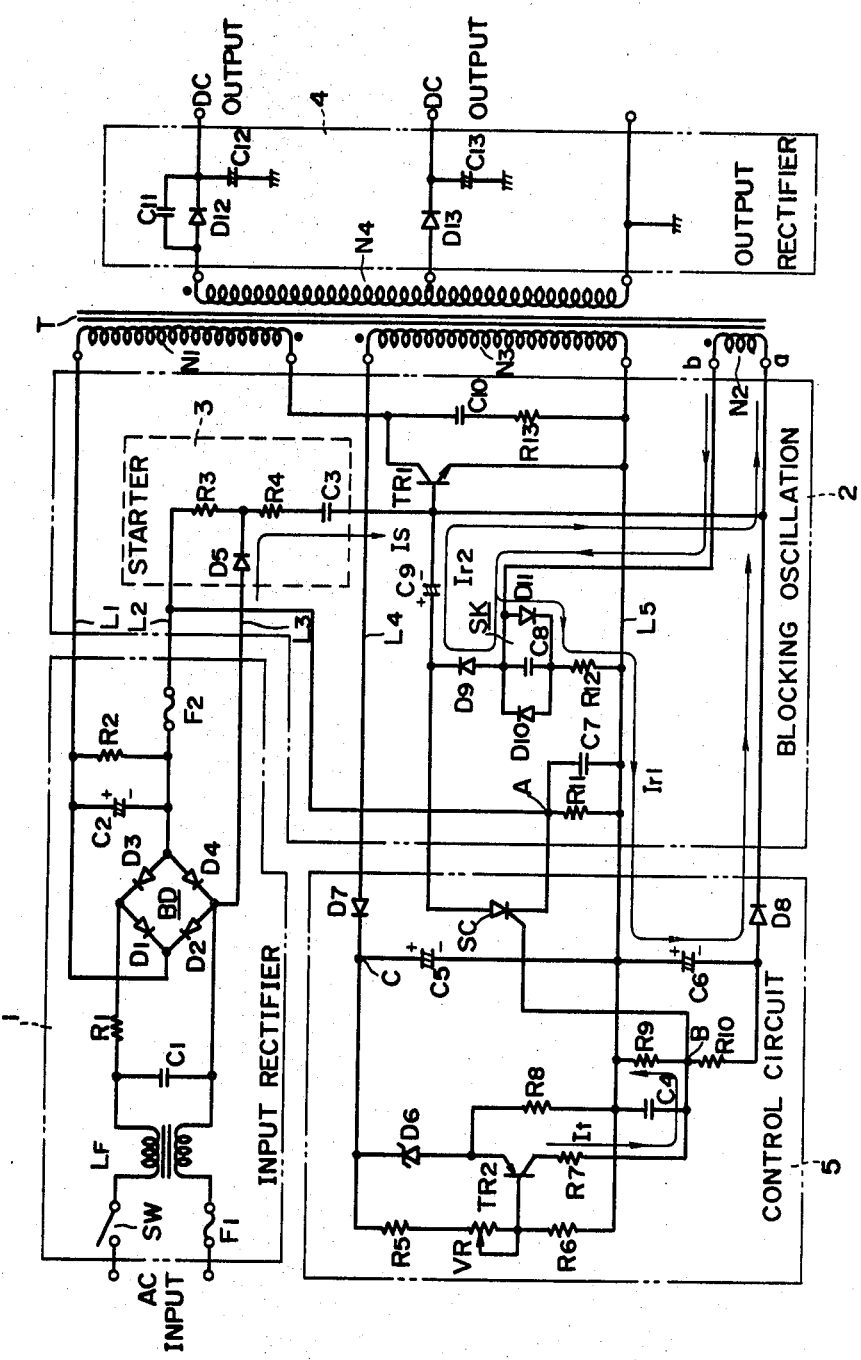
FIG. 1 is a schematic diagram showing one example of a switching regulator type power supply circuit of the prior art.
Figure 2:
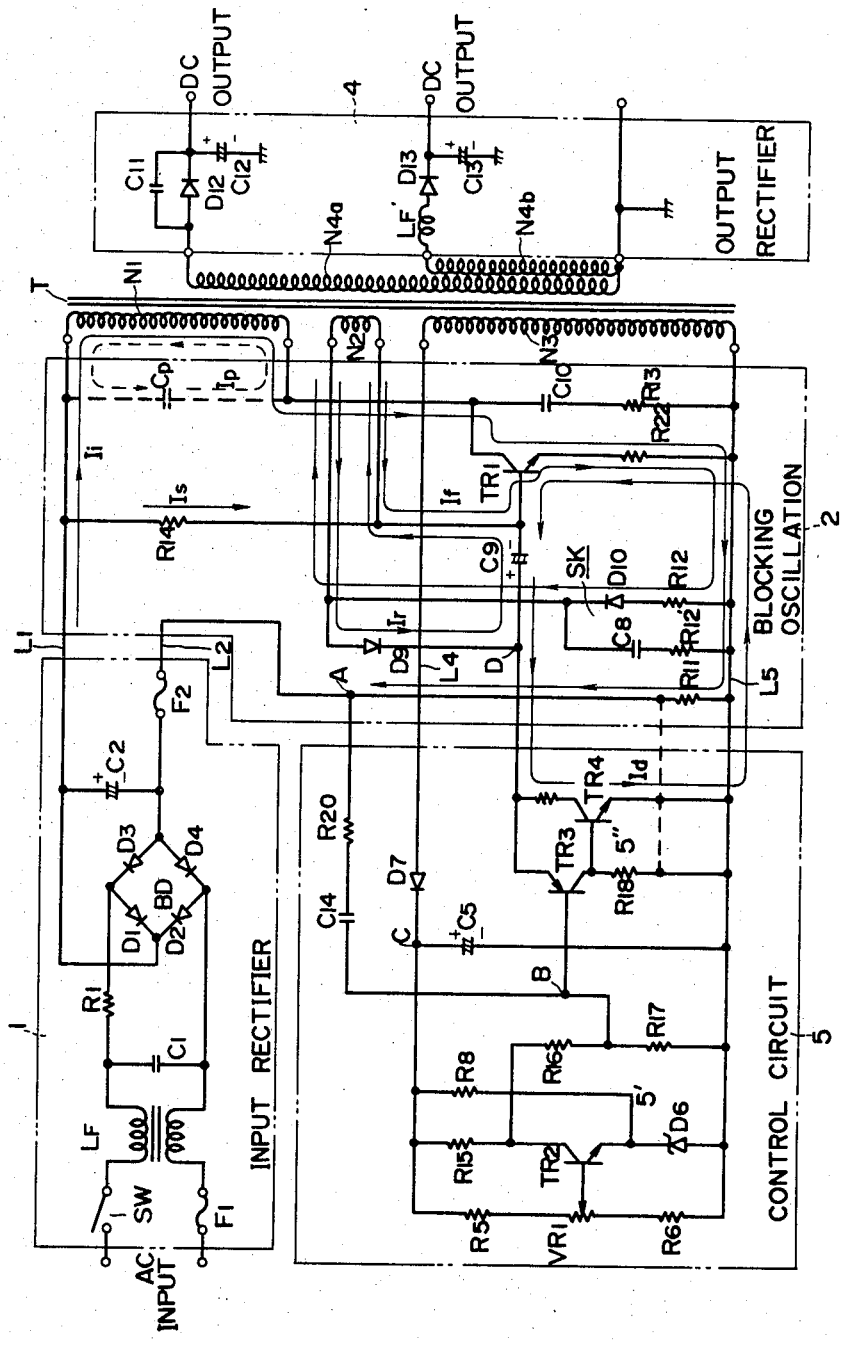
FIG. 2 is a schematic diagram showing one embodiment of the present invention.

FIG. 2 is a schematic diagram showing one embodiment of the inventive power supply circuit, wherein like portions are denoted by the same reference characters as those used in FIG. 1. More specifically, the input rectifying portion 1 comprises a line filter LF and a bridge rectifying circuit BD, as structured in the same manner as that in FIG. 1; however, it should be noted that the discharging resistor of the smoothing capacitor C2 denoted by the reference character R2 in FIG. 1 has been omitted.

The blocking oscillator portion 2 is basically structured in the same manner as that in FIG. 1 but is characterized in that a single starting resistor R14 is used in place of the starting circuit 3 in FIG. 1. Meanwhile, the capacitor C10 and the resistor R13 are included for the purpose of waveshaping of a voltage developed across the input winding N1 on the occasion of turning off of the switching transistor TR1.

As regards the output rectifying portion 4, the output winding of the converter transformer T is divided into a first winding N4a and a second winding N4b, such that the direct current voltages of different voltage values may be obtained from the respective windings, although there is no particular importance in this respect.

The error detecting portion 5' of the control circuit portion 5 is structured in substantially the same manner as that in FIG. 1 except that the transistor TR2 is implemented by an NPN type transistor but the switching control poriton 5" is entirely different from FIG. 1 and is structured in the manner set forth in the following. More specifically, the collector and emitter of each of the two stage connected switching transistors TR3 and TR4 are connected between the junction D of the diode D9 and the capacitor C9 for turning off the switching transistor and the line L5 at the cold end of the detecting winding N3. The base of the transistor TR3 at the preceding stage is connected to the dividing junction B of the resistors R16 and R17 of the error detecting portion and the junction B is connected to the junction A of the input line L2 side of the resistor R11 connected in series to the input winding N1 and the collector and emitter of the switching transistor TR1.

Now an operation of the embodiment shown will be described with reference to waveforms shown in FIG. 3.

At the outset, on the occasion of starting immediately after turning on of the power supply switch SW, the starting current Is flows from the line L1 of the input rectifying portion 1 through the base and emitter of the switching transistor TR1, whereby the switching transistor TR1 is turned on and the current Ii flows through the input winding N1. Then a voltage is induced in the feedback winding N2 by the above described current and, since the voltage thus induced is in a positive feedback direction, a positive feedback current If flows from the above described winding N2 through the path shown, whereby the switching transistor TR1 is maintained in an on state.

During an on period of the switching transistor TR1 the collector current linearly increases due to the inductance of the input winding N1. When the collector current becomes $\beta$ times ($\beta$ is a current amplification factor of the switching transistor TR1) the above described feedback current If (a predetermined value) determined by the impedance of the series/parallel circuit SK, the switching transistor TR1 can not continue on any more, thereby to turn to an off state. More specifically, when the collector current becomes as large as $\beta$ times as described previously, the current becomes saturated and does not change any more. Accordingly, a change in the current flowing through the input winding N1 comes not to be caused and a change in the magnetic flux comes not to occur. Therefore, no output is obtained from the feedback winding N2.

When the switching transistor TR1 turns to an off state, a voltage of the polarity opposite to that on the occasion of the previously described on state is developed in the feedback winding N2, whereby a current Ir flows from the above described winding N2 through the path shown to charge the capacitor C9. As a result, it follows that a positive voltage is developed at the point D. On the other hand, in such a state a rectangular waveform voltage of a peak value associated with energy stored in the input winding N1 on the occasion of turning on of the transistor TR1 is developed in the output winding N4a, and the said rectangular waveform voltage is rectified and smoothed by means of the diode D12 and the capacitor C12 and the output is supplied to a load circuit, not shown, while a current flowing through the above described output winding N4a gradually decreases. Such phenomenon occurs with respect to the output winding N4b as well.

When the current flowing through the above described output winding N4a becomes zero, a resonance operation is caused by the inductance of the input winding N1 and a distributed capacitance (a capacitor CP shown by the dotted line in the figure for convenience), so that a resonance current Ip shown by the dotted line flows, which gradually increases.

The above described resonance current Ip once reaches the maximum value, whereupon the same starts flowing in the direction opposite to that shown by the dotted line. Then the current in the opposite direction comes to develop a positive feedback voltage in the feedback winding N2 and a positive feedback current If comes to flow from the winding N2 through the above described path and accordingly the switching transistor TR1 is again turned to an on state. Since the above described operation is expedited by the positive feedback function at that time, such operation is achieved instantaneously as soon as the direction of the resonance current Ip is reversed.

When the switch transistor TR1 is thus brought again to an on state, thereafter the same operation as described above is repeated a few times, thereby to enter into a steady state operation to be set forth in the following. Meanwhile, the operation on the occasion of the previously described starting (a turn on operation due to resonance, in particular) will be understood with ease by referring to the waveforms in FIG. 3 showing the steady state.

Figure 3:
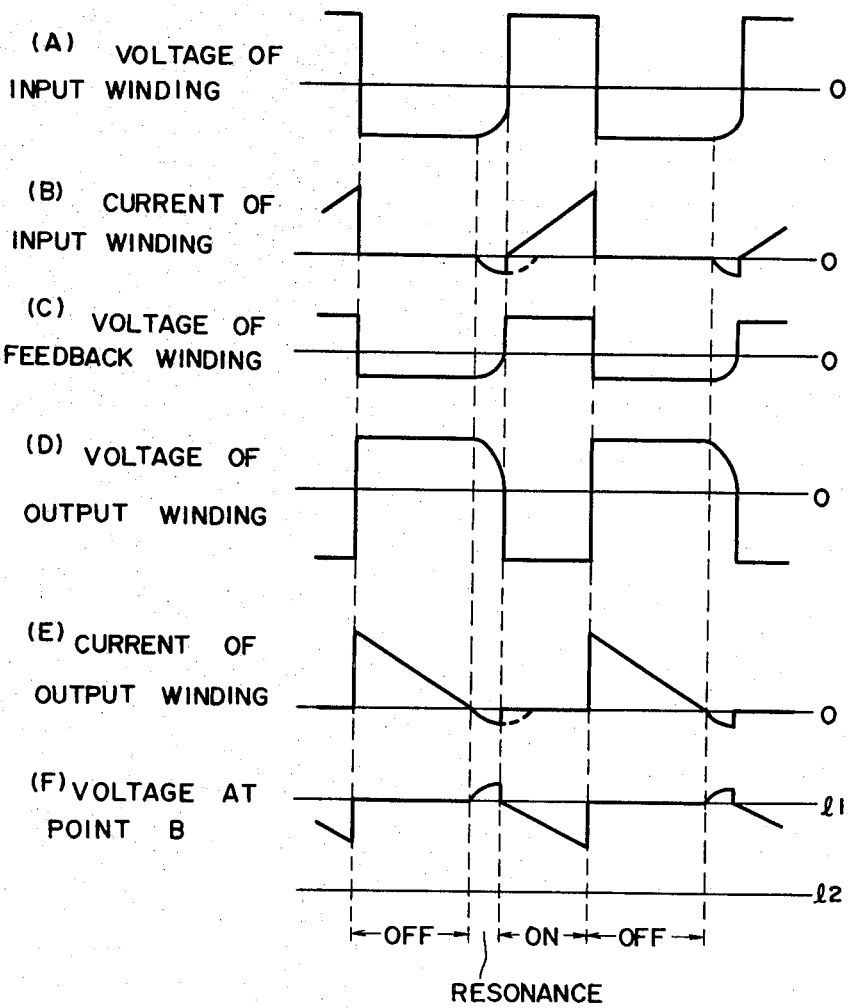
FIG. 3 is a graph showing waveforms of the signals for explaining a steady operation of the FIG. 2 embodiment, wherein (A) shows a voltage of the input winding, (B) shows a current Ii flowing through the input winding, (C) shows a voltage of the output winding, (D) shows a current flowing through the output winding, and (F) shows a voltage at the point B.

In the case where the switching transistor TR1 is turned on in a state after starting, a current Ii (see (B) in FIG. 3) flows through the input winding N1 as in the case of starting. Then a negative voltage (see (F) in FIG. 3, deeming 1 as a reference potential) increasing as per the lapse of time is developed at the point A by the resistor R11 and the said voltage is applied to the point B through the resistor R20 while a direct current component is removed by the capacitor C14.

On the other hand, a rectangular waveform voltage is developed in the detecting winding N3 in the steady state and the same is rectified and smoothed by the diode D7 and the capacitor C5, whereby a positive voltage is developed at the point C. The said voltage is divided by the resistors R5 and R6 and the divided voltage is compared with a reference voltage determined by the zenor diode D6 by means of the transistor TR2, with the result that a positive voltage of the magnitude associated with the above described positive voltage is developed at the point B. Since a voltage supplied from the previously described point A is superposed on the said voltage, it follows that the voltage at the point B is that determined with l2 of (F) in FIG. 3 as a reference potential.

Therefore, when the voltage at the point B reaches a voltage lower by a rise voltage $V_{BE}$ between the base and emitter of the transistor TR4 than the voltage at the point D due to the capacitor C9 charged during an off period of the switching transistor TR1, the transistor TR3 is turned on and accordingly the transistor TR4 is also turned on. Then, since a voltage across the capacitor C9 is applied between the base and emitter of the switching transistor TR1 through the collector and emitter of both transistors, the transistor TR1 is brought to a reverse biased state and is turned to an off state.

When the switching transistor TR1 is thus turned to an off state, then the same is turned to an on state due to the same resonance operation as in the case of the above described starting and thereafter the above described operation is repeated. Meanwhile, (A), (C), (D) and (E) in FIG. 3 show a voltage of the input winding, a voltage of the feedback winding, a voltage of the output winding and a current of the output winding, respectively.

Meanwhile, since the voltage at the point C is zero during the on period immediately after starting of the switching transistor TR1 in the foregoing description, it follows that the negative voltage developed at the point A is directly applied to the base of the transistor TR3. However, since in such a state the capacitor C9 has not been charged, the point D has become approximately the same potential as that of the line L5. Therefore, the above described transistor TR3 is not rendered conductive during that time period and accordingly turning off of the switching transistor TR1 is achieved through saturation of the current Ii as described above.

Now in the case where the alternating current input voltage or the load state changes in such steady state, a constant voltage control is performed in the manner set forth in the following. More specifically, in the case where the alternating current input voltage increases, the direct current voltages obtained from the output windings 4Na and 4Nb increase. Since the output windings 4Na and 4Nb are closely coupled to the detecting winding N3, the voltage at the point C accordingly increases. As a result, the biasing voltage at the point B (l1 of (F) in FIG. 3) decreases and accordingly the turning-off timing of the switching transistor TR1 is advanced. Therefore, the energy stored in the input winding N1 is decreased and accordingly the peak value of rectangular waveform voltage (see (A) in FIG. 3) developed during the off period of the switching transistor TR1 is decreased, whereby the direct current output is decreased. Meanwhile, in the case of a decrease of the alternating current input voltage, an operation direct opposite to the foregoing is performed and the same applies in the case where the direct current output voltage varies due to variation of a load state.

Meanwhile, the collector of the transistor TR3 and the emitter of the transistor TR4 may be connected to the point A as shown by the dotted line in place of being connected to the line L5. By doing so, the collector and the emitter of the transistors TR4 and TR5 are fully biased, even in the case where the voltage across the capacitor C9 is relatively low, with the resultant advantage that turning on is assuredly achieved. However, on the other hand, it follows that the magnitude of the current Id flowing through the path shown with the capacitor C9 as a voltage source is influenced by the resistor R11, inasmuch as an excessive charge in the base and collector regions is removed on the occasion of turning off of the switching transistor TR1. Therefore, it is disadvantageous in selecting the magnitude of the above described current Id to such a value in which the excessive charge is discharged with a predetermined rate to shorten the fall time of the switching transistor TR1. The reason is that since the above described resistor R11 is to determine that the turn-off timing of the transistor TR1 the resistance value thereof cannot primarily determined only in consideration of the above described fall time.

The resistor R22 connected between the emitter of the switching transistor TR1 and the line L5 decreases the positive feedback current If from the feedback winding Nf due to the so-called current feedback function on the occasion of turning off by the above described self-saturating function of the transistor, thereby to advance the above described turning-off operation. Since the resistor R22 does not exert any particular influence upon the normal state operation, the same can be despensed with.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A switching regulator type power supply circuit, comprising:
    transformer means having an input winding, an output winding, and a feedback winding and a detecting winding electromagnetically coupled to said input winding and said output winding,
    a switching transistor having a base, a collector and an emitter and for on/off controlling a direct current input being applied thereto,
    detecting resistor means being interposed in a path allowing for a flow of a collector-emitter current flowing through said collector-emitter of said switching transistor,
    said input winding, said collector and emitter of said switching transistor and said detecting resistor means being connected in the described order in series with said direct current input,
    said base of said switching transistor being connected to one end of said feedback winding of said transformer means, a series connection of a capacitor and a diode connected between said one end and the other end of said feedback winding of said transformer means in the described order, said capacitor being charged with a voltage developed across said feedback winding of said transformer means on the occasion of non-conduction of said switching transistor, transistor switching means having an input terminal, an output terminal and a control terminal, connection means for connecting said input terminal of said transistor switching means to the junction of said diode and said capacitor and for connecting said input terminal of said transistor switching means to said emitter of said switching transistor, and voltage supplying means for supplying to said control terminal of said transistor switching means a composite voltage of a direct current voltage changeable in accordance with the voltage obtained from said detecting winding and the voltage developed across said detecting resistor, whereby said transistor switching means is rendered conductive when said voltage at said control terminal of said transistor switching means becomes lower by a predetermined value than the voltage at said junction of said diode and said capacitor and said switching transistor is turned off by the voltage at said capacitor being applied between said base and emitter of said switching transistor.

2. A switching regulator type power supply circuit in accordance with claim 1, wherein the voltage supplying means comprises:

first means for supplying a voltage developed across said detecting resistor means to said control terminal of said transistor switching means; and second means for supplying a variable direct current voltage to said control terminal of said transistor switching means.

3. A switching regulator type power supply circuit in accordance with claim 2, wherein said respective first and second means means comprises means for generating a reference voltage, and means for comparing said voltage obtained from said detecting winding with said reference voltage for amplifying a difference therebetween for generating said variable direct current voltage.

4. A switching regulator type power supply circuit in accordance with claim 1, which further comprises start circuit means connected between a line for supply of said direct current input and said base of said switching transistor.

5. A switching regulator type power supply circuit in accordance with claim 4, wherein said start circuit means comprises a single resistor means.

6. A switching regulator type power supply circuit in accordance with claim 5, wherein said direct current input comprises means for providing an alternating current input, means for rectifying said alternating current input, and smoothing capacitor means for smoothing the output from said rectifying means, said detecting resistor means included in said start circuit serving as a discharging resistor of said smoothing capacitor means.

7. A switching regulator type power supply circuit in accordance with any one of the preceding claims, wherein said connecting means comprises said detecting resistor means.

8. A switching regulator type power supply circuit in accordance with any one of the preceding claims 1 to 6, wherein said connecting means comprises means for directly connecting the junction of said diode and said capacitor to said emitter of said switching transistor.

* * * * *